United States Patent
Tanigawa et al.

(10) Patent No.: US 11,286,349 B2
(45) Date of Patent: Mar. 29, 2022

(54) SURFACE TREATMENT AGENT FOR THERMALLY CONDUCTIVE POLYORGANOSILOXANE COMPOSITION

(71) Applicant: MOMENTIVE PERFORMANCE MATERIALS JAPAN LLC, Tokyo (JP)

(72) Inventors: Eiji Tanigawa, Tokyo (JP); Masanori Takanashi, Tokyo (JP); Isao Iida, Tokyo (JP); Daigo Hirakawa, Tokyo (JP); Kenji Takenaka, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 268 days.

(21) Appl. No.: 16/319,624

(22) PCT Filed: Jul. 20, 2017

(86) PCT No.: PCT/JP2017/026218
§ 371 (c)(1),
(2) Date: Jan. 22, 2019

(87) PCT Pub. No.: WO2018/016565
PCT Pub. Date: Jan. 25, 2018

(65) Prior Publication Data
US 2021/0147633 A1  May 20, 2021

(30) Foreign Application Priority Data
Jul. 22, 2016  (JP) .............................. JP2016-144434

(51) Int. Cl.
| C08G 77/18 | (2006.01) |
| C08G 77/50 | (2006.01) |
| C08K 3/013 | (2018.01) |
| C08K 9/06 | (2006.01) |
| C08G 77/04 | (2006.01) |

(52) U.S. Cl.
CPC ........... *C08G 77/18* (2013.01); *C08G 77/045* (2013.01); *C08G 77/50* (2013.01); *C08K 3/013* (2018.01); *C08K 9/06* (2013.01); *C08K 2201/001* (2013.01)

(58) Field of Classification Search
None
See application file for complete search history.

(56) References Cited

U.S. PATENT DOCUMENTS

| 5,021,494 | A | 6/1991 | Toya |
| 6,114,429 | A | 9/2000 | Yamada et al. |
| 6,169,142 | B1 | 1/2001 | Nakano et al. |
| 6,306,957 | B1 | 10/2001 | Nakano et al. |
| 7,141,273 | B2 | 11/2006 | Endo et al. |
| 7,279,224 | B2 | 10/2007 | Aoki et al. |
| 7,692,032 | B2 | 4/2010 | Hoshino |
| 8,802,763 | B2 | 8/2014 | Yamada et al. |
| 10,683,444 | B2 | 6/2020 | Takanashi et al. |
| 10,808,154 | B2 | 10/2020 | Gubbles et al. |
| 2002/0022127 | A1 | 2/2002 | Katsuda et al. |
| 2003/0229174 | A1 | 12/2003 | Goto et al. |

(Continued)

FOREIGN PATENT DOCUMENTS

| CN | 1860181 A | 11/2006 |
| CN | 101641412 A | 2/2010 |

(Continued)

OTHER PUBLICATIONS

Machine translation into English for JP 2014-234506 (no date).*
Extended European Search Report (EESR) dated Mar. 6, 2020 issued in European Application No. 17831081.9.
Related U.S. Appl. No. 15/772,690; First Named Inventor: Eiji Tanigawa; Title: "Method for Producing a Thermally Conductive Polysiloxane Composition"; filed May 1, 2018.

(Continued)

*Primary Examiner* — Marc S Zimmer
(74) *Attorney, Agent, or Firm* — Holtz, Holtz & Volek PC

(57) ABSTRACT

A siloxane compound represented by the general formula (1):

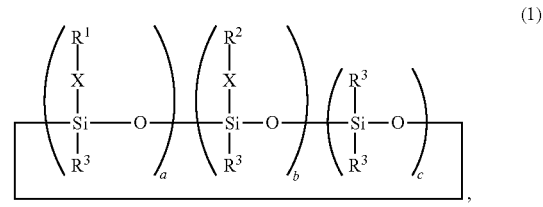

where $R^1$ is a group having an alkoxysilyl group having 1 to 4 carbon atoms, $R^2$ is a linear organosiloxy group represented by the general formula (2):

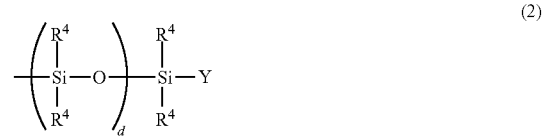

where each $R^4$ is independently a monovalent hydrocarbon group having 1 to 12 carbon atoms, Y is a monovalent hydrocarbon group having 1 to 6 carbon atoms, and d is an integer of 10 to 50, each X is independently a divalent hydrocarbon group having 2 to 10 carbon atoms, each of a and b is independently an integer of 1 or more, c is an integer of 0 or more, a+b+c is an integer of 4 or more, and each $R^3$ is independently a monovalent hydrocarbon group having 1 to 6 carbon atoms.

4 Claims, No Drawings

(56) References Cited

U.S. PATENT DOCUMENTS

| | | |
|---|---|---|
| 2005/0049357 A1 | 3/2005 | Zhong et al. |
| 2007/0185259 A1 | 8/2007 | Hoshino |
| 2010/0048435 A1 | 2/2010 | Yamagata et al. |
| 2010/0140538 A1 | 6/2010 | Sekiba |
| 2011/0009544 A1 | 1/2011 | Funahashi |
| 2016/0152794 A1 | 6/2016 | Diaham et al. |
| 2017/0081578 A1 | 3/2017 | Kato et al. |
| 2019/0161666 A1 | 5/2019 | Tanigawa et al. |
| 2020/0123327 A1* | 4/2020 | Sakurai ................ C09D 183/14 |
| 2020/0140736 A1 | 5/2020 | Takenaka et al. |

FOREIGN PATENT DOCUMENTS

| | | |
|---|---|---|
| EP | 3299420 A1 | 3/2018 |
| EP | 3575365 A1 | 12/2019 |
| JP | S62225533 A | 10/1987 |
| JP | 02097559 A | 4/1990 |
| JP | H06209057 A | 7/1994 |
| JP | 08208993 A | 8/1996 |
| JP | H11199672 A | 7/1999 |
| JP | 2000001616 A | 1/2000 |
| JP | 2000095896 A | 4/2000 |
| JP | 2000256558 A | 9/2000 |
| JP | 2001158609 A | 6/2001 |
| JP | 2001158610 A | 6/2001 |
| JP | 2001189407 A | 7/2001 |
| JP | 2002003831 A | 1/2002 |
| JP | 2002047009 A | 2/2002 |
| JP | 2002299533 A | 10/2002 |
| JP | 2003213133 A | 7/2003 |
| JP | 2004010880 A | 1/2004 |
| JP | 2005023246 A | 1/2005 |
| JP | 2005162975 A | 6/2005 |
| JP | 2006143978 A | 6/2006 |
| JP | 2007119588 A | 5/2007 |
| JP | 2008150439 A | 7/2008 |
| JP | 2008156578 A | 7/2008 |
| JP | 2008266449 A | 11/2008 |
| JP | 2008280395 A | 11/2008 |
| JP | 2009096961 A | 5/2009 |
| JP | 2009203373 A | 9/2009 |
| JP | 2010006923 A | 1/2010 |
| JP | 2010150321 A | 7/2010 |
| JP | 2013147600 A | 8/2013 |
| JP | 2013234237 A | 11/2013 |
| JP | 2014-234506 A * | 12/2014 |
| JP | 2015013927 A | 1/2015 |
| JP | 2015071662 A | 4/2015 |
| WO | 2005030874 A1 | 4/2005 |
| WO | 2008047809 A1 | 4/2008 |
| WO | 2009136508 A1 | 11/2009 |
| WO | 2015004115 A1 | 1/2015 |
| WO | 2016190188 A1 | 12/2016 |
| WO | 2016190189 A1 | 12/2016 |
| WO | WO 2017/115679 A1 * | 7/2017 |

OTHER PUBLICATIONS

International Search Report (ISR) dated Sep. 12, 2017 issued in International Application No. PCT/JP2017/026218.

Written Opinion dated Sep. 12, 2017 issued in International Application No. PCT/JP2017/026218.

Office Action (Non-Final Rejection) dated May 1, 2020 issued in related U.S. Appl. No. 15/772,690.

Korean Office Action (and English language translation thereof) dated May 12, 2021 issued in Korean Application No. 10-2019-7005321.

Office Action (Non-Final Rejection) dated Jun. 1, 2021 issued in related U.S. Appl. No. 15/772,690.

Japanese Office Action (and English language translation thereof) dated Feb. 24, 2021 issued in Japanese Application No. 2018-100426.

Chinese Office Action (and partial English language translation thereof) dated Jan. 20, 2021 issued in Chinese Application No. 201780038857.4.

Extended European Search Report (EESR) dated Feb. 10, 2021 issued in European Application No. 18808875.1.

International Search Report (ISR) dated Jul. 3, 2018 (and English translation thereof), issued in International Application No. PCT/JP2018/020905.

International Search Report (ISR) dated Oct. 10, 2017 issued in International Application No. PCT/JP2017/026219.

Office Action (Non-Final Rejection) dated Feb. 26, 2021 issued in related U.S. Appl. No. 16/618,083.

U.S. Appl. No. 16/319,639, First Named Inventor: Daigo Hirakawa; Title: "Thermally Conductive Polysiloxane Composition"; filed Jan. 22, 2019.

U.S. Appl. No. 16/618,083, First Named Inventor: Kenji Takenaka; Title: "Thermally Conductive Polysiloxane Composition"; filed Nov. 27, 2019.

Written Opinion dated Oct. 10, 2017 issued in International Application No. PCT/JP2017/026219.

Written Opinion of the International Searching Authority dated Jul. 3, 2018 issued in International Application No. PCT/JP2018/020905.

Chinese Office Action (and English language translation thereof) dated Jun. 8, 2021, issued in Chinese Application No. 201880036368.X.

Edited by Wang, "Green Chemical Additives", Jan. 2006.

Edited by Wang, "Production and Application of Epoxy Resins", Jun. 2001.

Zhou, et al., "Thermally Conductive Polymer Materials", Apr. 2014.

\* cited by examiner

SURFACE TREATMENT AGENT FOR THERMALLY CONDUCTIVE POLYORGANOSILOXANE COMPOSITION

FIELD OF THE INVENTION

The present invention relates to a siloxane compound for a surface treatment agent used in a thermally conductive polyorganosiloxane composition.

BACKGROUND ART

In electronic parts, such as a power transistor, an IC, and a CPU, for preventing accumulation of heat caused due to electrical heating elements, a thermally conductive grease or a thermally conductive sheet having high thermal conductivity is used. The thermally conductive grease has an advantage in that it can be applied with ease to electronic parts irrespective of the shapes of the electronic parts, but has problems, for example, in that the grease stains or breaks other parts and in that an oil component oozes out of the grease. The thermally conductive sheet does not stain or break other parts or cause an oil component to ooze; however, the sheet has poorer adhesion than the grease, and therefore, in order to improve the adhesion of the thermally conductive sheet, a method of reducing the hardness of the sheet is employed.

Silicone rubbers are widely used in the thermally conductive sheet. Silicone cannot enhance the thermal conductivity by itself and therefore, for improving the silicone rubber in thermal conductivity, a thermally conductive filler and the silicone rubber are used in combination. It has been known that, as a thermally conductive filler, a material having higher thermal conductivity than that of a silicone as a binder, such as a silica powder, alumina, boron nitride, aluminum nitride, or magnesium oxide, is added (Japanese Unexamined Patent Publication No. 2002-003831).

When silicone as a binder is filled with the filler comprising the above-mentioned inorganic particles as such, the resultant compound is likely to be markedly increased in viscosity, so that the fluidity of the compound becomes poor, making the working difficult. Further, a considerably long period of time is required for uniformly dispersing the filler in silicone, depending on the type of the filler used, so that the productivity is disadvantageously lowered. For solving these problems, means for subjecting the thermally conductive filler to surface treatment with various types of surface treatment agents to improve the filling property have been proposed (see Japanese Unexamined Patent Publication Nos. 2000-1616, 2000-256558, and 2003-213133).

PRIOR ART REFERENCES

Patent Documents

Patent document 1: Japanese Unexamined Patent Publication No. 2002-003831
Patent document 2: Japanese Unexamined Patent Publication No. 2000-1616
Patent document 3: Japanese Unexamined Patent Publication No. 2000-256558
Patent document 4: Japanese Unexamined Patent Publication No. 2003-213133

SUMMARY OF THE INVENTION

Problems to be Solved by the Invention

In order to achieve high radiator properties as a radiator member, there are used inorganic particles having a very small particle diameter, such as alumina particles, which have been surface-treated with hydrolyzable siloxane. However, electronic parts recently used and others likely generate heat in an increased amount as electronic devices have increasingly high output, and thus a radiator member having an even higher thermal conductivity is required. For obtaining a silicone composition having a high thermal conductivity for meeting the above demand, it is necessary to fill the composition with a thermally conductive filler at a higher filling ratio. Furthermore, it is desired that the obtained silicone composition has excellent handling properties. Meanwhile, the surface treatment agent used in the silicone rubber is required not only to enable a treatment of the thermally conductive filler with high efficiency, but also to achieve high heat resistance of the surface treatment agent itself. For these reasons, an attempt to find a surface treatment agent which can provide a composition having excellent thermal conductivity and operating properties is desired.

The present invention has been made for solving the above-mentioned problems, and an object of the present invention is to provide a surface treatment agent for a thermally conductive filler, which can produce a composition having excellent working properties, thermal conductivity, and operating properties.

Means for Solving the Problems

The inventors have conducted extensive and intensive studies with a view toward solving the above-mentioned problems. As a result, it has been found that the design of the molecular structure of a surface treatment agent enables higher filling for a filler, improving the thermally conductive polysiloxane composition in thermal conductivity, and the present invention has been completed.

The present invention is directed to the following items.

[1] A siloxane compound which is represented by the following the general formula (1):

[Chemical formula 1]

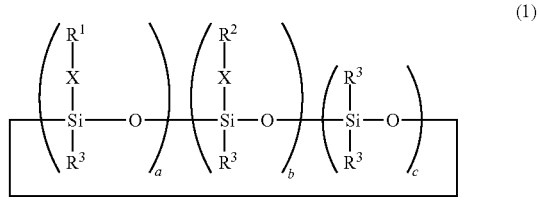

wherein:
R$^1$ is a group having an alkoxysilyl group having 1 to 4 carbon atoms;
R$^2$ is a linear organosiloxy group represented by the following general formula (2):

[Chemical formula 2]

wherein each R$^4$ is independently a monovalent hydrocarbon group having 1 to 12 carbon atoms, Y is a monovalent hydrocarbon group having 1 to 6 carbon atoms, and d is an integer of 10 to 50;

each X is independently a divalent hydrocarbon group having 2 to 10 carbon atoms;

each of a and b is independently an integer of 1 or more;

c is an integer of 0 or more;

a+b+c is an integer of 4 or more; and each $R^3$ is independently a monovalent hydrocarbon group having 1 to 6 carbon atoms.

[2] The siloxane compound according to item [1] above, wherein, in the general formula (1), b is 2, and d is 10 to 40.

[3] The siloxane compound according to item [1] above, wherein, in the general formula (1), b is 1.

[4] A surface treatment agent for a thermally conductive filler, comprising the siloxane compound according to any one of items [1] to [3] above.

Effects of the Invention

In the present invention, there can be provided a surface treatment agent for a thermally conductive filler, which can produce a composition having excellent working properties, thermal conductivity, and operating properties.

MODE FOR CARRYING OUT THE INVENTION

One of the embodiment of the present invention is a siloxane compound represented by the following general formula (1):

[Chemical formula 3]

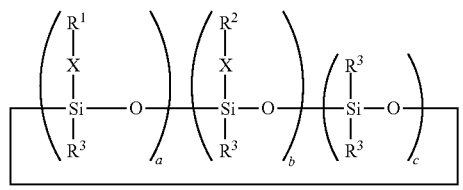

(1)

wherein $R^1$, $R^2$, $R^3$, X, a, b, and c are as defined above.

In the siloxane compound, the unit containing $R^1$, the unit containing $R^2$, and the unit represented by $SiR^3_2O$ are not necessarily arranged as shown in the general formula (1) above, and it is understood that, for example, the unit represented by $SiR^3_2O$ may be present between the unit containing R' and the unit containing $R^2$.

The siloxane compound having the cyclic structure represented by the general formula (1) can have introduced a large number of hydrolyzable groups into the cyclic structure, and further has the hydrolyzable groups concentrated in the position of the structure, and therefore is considered to have an increased treatment efficiency for a thermally conductive filler, enabling higher filling. In addition, the siloxane compound per se has high heat resistance, and therefore can cause the thermally conductive polysiloxane composition to have high heat resistance. Further, there is not a specific theory, but it is presumed that, by virtue of having a siloxane chain having an appropriate length in the molecule, the siloxane compound has a portion which interacts with particles of a thermally conductive filler and another portion which interacts with a silicone polymer and the distance between these portions is appropriately suppressed, so that the siloxane compound serves as an appropriate medium for the inorganic particles which are a thermally conductive filler and the silicone polymer which is a base polymer, reducing the viscosity of the composition. Furthermore, such a siloxane compound has an advantage in that the compound can be easily obtained by, for example, subjecting to addition reaction a cyclic siloxane containing a hydrogen group, a siloxane having a vinyl group at one end thereof, and a silane compound containing a vinyl group and a hydrolyzable group.

In the general formula (1), $R^1$ is a hydrolyzable functional group containing an alkoxysilyl group having 1 to 4 carbon atoms, and, as more specific examples, there can be mentioned groups having the structures shown below. $R^1$ may be directly bonded to X with silicon, but may be bonded to X through a linking group, such as an ester linkage. More specific examples of $R^1$'s include groups having the structures shown below.

[Chemical formula 4]

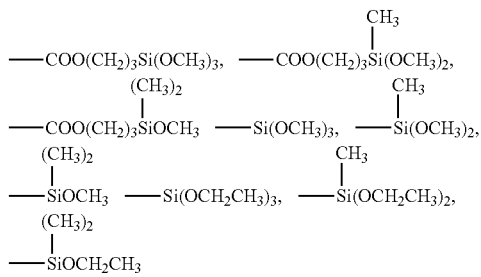

Especially, in view of a tendency toward a further improvement of the treatment efficiency for the thermally conductive filler, $R^1$ is preferably a group of a structure having two or more alkoxysilyl groups, especially having three alkoxysilyl groups. Further, in view of easy availability of the raw material, $R^1$ preferably contains a methoxysilyl group.

$R^2$ is a group represented by the following general formula (2):

[Chemical formula 5]

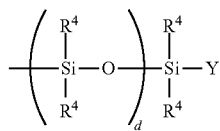

(2)

wherein $R^4$, Y, and d are as defined above.

In the general formula (2), d is a number in the range of from 10 to 50, preferably in the range of from 10 to 40, more preferably in the range of from 20 to 30. When d is in this range, the effect on the fluidity is improved, enabling high incorporation, so that the viscosity of the siloxane compound per se can be reduced, and further the stability is improved. Each $R^4$ is independently a monovalent hydrocarbon group having 1 to 12 carbon atoms, and examples of $R^4$'s include linear or branched $C_{1-12}$ alkyl groups, and aryl groups, such as phenyl and naphthyl. $R^4$ may be substituted with a halogen, such as chlorine, fluorine, or bromine, and examples of such groups include perfluoroalkyl groups, such as a trifluoromethyl group. In view of easy synthesis of the compound, $R^4$ is preferably a methyl group. Y is a monovalent hydrocarbon group having 1 to 6 carbon atoms. In view of easy synthesis of the compound, Y is preferably a methyl group.

$R^1$ and $R^2$ are individually bonded through group X to the cyclic siloxane portion of the siloxane represented by the general formula (1). Group X is a divalent hydrocarbon group having 2 to 10 carbon atoms, and examples of such groups include alkylene groups, such as —CH$_2$CH$_2$—, —CH$_2$CH$_2$CH$_2$—, —CH$_2$CH$_2$CH$_2$CH$_2$CH$_2$CH$_2$—, —CH$_2$CH(CH$_3$)—, and —CH$_2$CH(CH$_3$)CH$_2$—. In view of easy synthesis of the compound, X is preferably —CH$_2$CH$_2$— or —CH$_2$CH(CH$_3$)—.

Each $R^3$ is independently a monovalent hydrocarbon group having 1 to 6 carbon atoms. $R^3$'s may be the same or different. $R^3$ is preferably a methyl group in view of easy synthesis of the compound.

a is an integer of 1 or more, preferably 1. b is an integer of 1 or more, preferably 1 or 2, but the value of b as well as the value of d are preferably designed so that the number of —SiR$^4{}_2$O— units contained in the general formula (1) above falls in the range of from 20 to 60. c is an integer of 0 or more, preferably 0 to 2. Further, the total of a+b+c is an integer of 4 or more, and is preferably 4 in view of easy synthesis of the compound.

As representative examples of the above-described siloxane compounds, there can be mentioned compounds represented by the structural formulae shown below, but the present invention is not limited to these compounds.

[Chemical formula 6]

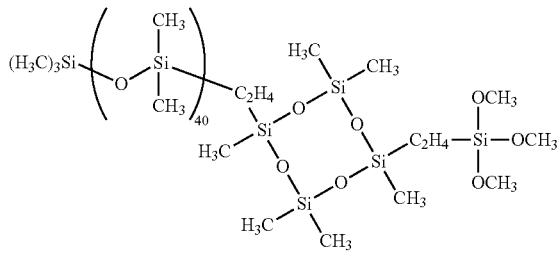
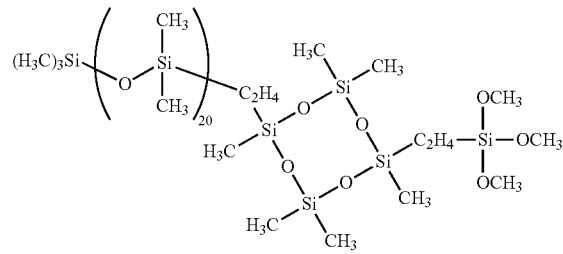
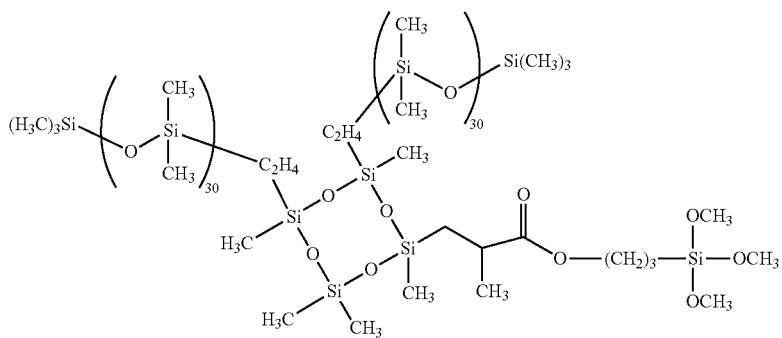
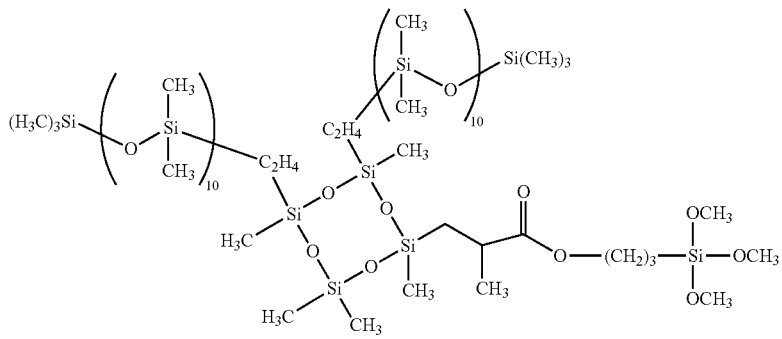

-continued

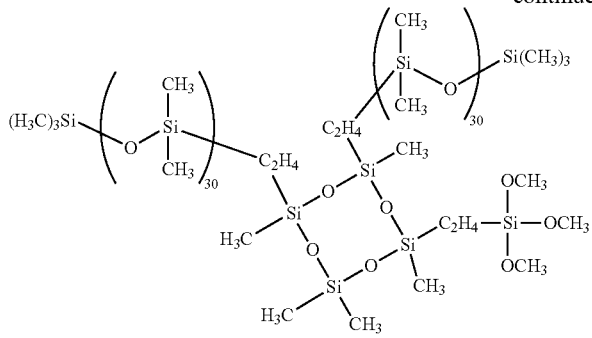

In the description of the structure of the siloxane compound, the structural units of the siloxane compound are frequently indicated using the abbreviations shown below (hereinafter, these structural units are frequently respectively referred to as, for example, "M unit" and "D unit").

M: —Si(CH$_3$)$_3$O$_{1/2}$
M$^H$: —SiH(CH$_3$)$_2$O$_{1/2}$
M$^{Vi}$: —Si(CH=CH$_2$)(CH$_3$)$_2$O$_{1/2}$
D: Si(CH$_3$)$_2$O$_{2/2}$
D$^H$: SiH(CH$_3$)O$_{2/2}$
T: Si(CH$_3$)O$_{3/2}$
Q: SiO$_{4/2}$

For example, the structure of the general formula (2) above wherein R$^4$ is a methyl group and Y is a vinyl group is indicated by -D$_n$M$^{Vi}$. In this connection, it is noted that, for example, when a structure is indicated by D$^H_{20}$D$_{20}$, it is understood that the indication is not intended to show that 20 D$^H$ units are continuously disposed and then 20 D units are continuously disposed, but shows that the individual units may be arbitrarily arranged.

The siloxane compound of the present invention can be produced by using a method known to those skilled in the art or a similar method. The siloxane of the structure represented by the general formula (1) can be obtained by an example of the method in which a cyclic siloxane having two or more Si—H bonds and an alkoxysilane having an unsaturated bond, such as vinyltrimethoxysilane, are reacted with each other, and then the resultant product is reacted with a linear polysiloxane having an unsaturated bond. The reaction conditions, purification method and others can be appropriately selected by those skilled in the art.

One of the embodiment of the present invention is a surface treatment agent for a thermally conductive filler, which comprises the above-described siloxane compound. The siloxane compound of the present invention serves as a surface treatment agent for a thermally conductive filler, and, by mixing the surface-treated thermally conductive filler into a silicone polymer which is a base polymer, it is possible to provide a thermally conductive composition having excellent handling properties. The thermally conductive filler and silicone polymer contained in the composition are described below.

[Thermally Conductive Filler]

Examples of thermally conductive fillers include generally known inorganic fillers, such as alumina, magnesium oxide, zinc oxide, boron nitride, aluminum nitride, a silica powder, silicon carbide, a metal powder, diamond, aluminum hydroxide, and carbon. Especially preferred are alumina, zinc oxide, aluminum nitride, and silicon carbide. With respect to the inorganic filler, there is no particular limitation as long as it is of a grade that can be used as a thermally conductive filler, and those which are commercially available can be used.

With respect to the average particle diameter of the thermally conductive filler, there is no particular limitation as long as the thermally conductive filler is of a grade that can be used as a thermally conductive filler, but a thermally conductive filler having an average particle diameter of 300 μm or less is preferably used. With respect to the thermally conductive filler having an average particle diameter in the above range, when the thermally conductive filler having a larger average particle diameter is incorporated, the filling ratio cannot be increased. On the other hand, when the thermally conductive filler having a smaller average particle diameter is incorporated, the resultant composition tends to have an increased viscosity. By incorporating the thermally conductive filler having an appropriately selected average particle diameter, a composition having a viscosity suitable for the purpose can be obtained.

With respect to the thermally conductive filler, it is preferred that a filler having a relatively large particle diameter and a filler having a relatively small particle diameter are used in combination. By using a plurality of types of fillers having different particle diameters in combination, the filler having a relatively small particle diameter goes into voids caused in the filler having a relatively large particle diameter, enabling higher filling. According to the average particle diameter, the filler can be classified into a filler having a larger particle diameter (for example, a particle diameter of 30 μm or more), a filler having an intermediate particle diameter (for example, a particle diameter of 1 to less than 30 μm), and a filler having a smaller particle diameter (for example, a particle diameter of less than 1 μm), and at least two or more types, particularly three types of these fillers are preferably used. When a plurality of types of fillers having different particle diameters are used, the proportion of the fillers incorporated can be arbitrary. However, from the viewpoint of the working properties of the preparation of the composition and the thermal conductivity of the obtained composition, the filler having a larger particle diameter is preferably in an amount of 30 to 70% by mass, more preferably 35 to 65%. When three types of fillers having a larger particle diameter, an intermediate particle diameter, and a smaller particle diameter are used, the ratio of the incorporated filler having an intermediate particle diameter and filler having a smaller particle diameter is preferably in the range of from 1:40 to 40:1, more preferably in the range of from 1:7 to 7:1.

With respect to the shape of the inorganic particles used as the thermally conductive filler, there is no particular limitation. For example, any of particles of a spherical shape, particles of a rounded shape, and particles of an indefinite shape can be used, and further two or more types of these particles can be used in combination. In the case where the inorganic particles have a rounded shape or an indefinite shape, the average particle diameter of the inorganic particles is defined by a method known to those skilled in the art. The average particle diameter can be determined as, for example, a weight average value (or a median diameter) using a particle size distribution measurement apparatus by, for example, a laser light diffraction method.

The amount of the filler incorporated into the thermally conductive polysiloxane resin is in the range of from 10 to 5,000 parts by mass, relative to 100 parts by mass of the total of the siloxane compound and the polysiloxane resin having a curable functional group. When the amount of the filler incorporated is preferably in the range of from 50 to 4,000 parts by mass, more preferably 100 to 3,000 parts by mass, the effects of the present invention are markedly exhibited.

[Silicone Polymer]

The thermally conductive polysiloxane composition in the present invention comprises a polyorganosiloxane resin as the silicone polymer which is a base polymer. With respect to the structure of the polyorganosiloxane resin, there is no particular limitation as long as the polyorganosiloxane resin is used as a base for, for example, a silicone grease or a silicone rubber, and a linear, branched, or cyclic polyorganosiloxane resin can be used. A modified silicone having a functional group introduced can be used. For example, for the purpose of changing the hardness of a grease, the polyorganosiloxane resin may have one or more curable functional groups that serve as a reactive site for a curing reaction. In the present specification, the term "curable functional group" means a functional group which is capable of taking part in a curing reaction of a resin. Examples of curable functional groups include a vinyl group, (a)an (meth)acryl group, and a hydrogen group directly bonded to silicon. From the viewpoint of the curing properties, the polyorganosiloxane resin preferably has two or more curable functional groups per molecule, and, in view of easy availability or easy preparation, the polyorganosiloxane resin preferably has two curable functional groups per molecule. A compound having one curable functional group per molecule can be used. Further, a plurality of types of compounds, of which the numbers of curable functional groups are different from each other, can be used in combination. With respect to the mechanism of the curing reaction, there is no particular limitation, and a method generally used in curing a resin, such as an addition reaction or a condensation reaction, can be employed.

As an example of the polysiloxane resin having a curable functional group which is cured by an addition reaction, there can be mentioned a linear polyorganosiloxane containing an aliphatic unsaturated group and being represented by the following general formula (3):

[Chemical formula 7]

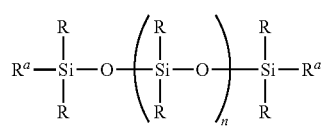
(3)

wherein:
each $R^a$ is independently an aliphatic unsaturated group,
each R is independently a $C_{1-6}$ alkyl group or a $C_{6-12}$ aryl group, and
n is the number that satisfies the viscosity of 0.01 to 50 Pa·s at 23° C.,
but the polysiloxane resin is not limited to the resin having the above structure. Of the linear polyorganosiloxanes, a polyorganosiloxane of the formula (3) wherein all R's are methyl and W is a vinyl group is preferably used because of ease of availability.

The amount of the incorporated polysiloxane resin having a curable functional group is preferably in the range of from 1 to 50 parts by mass, more preferably in the range of from 3 to 40 parts by mass, relative to 100 parts by mass of the thermally conductive filler. When the amount of the polysiloxane resin is in the above range, a uniform thermally conductive polysiloxane composition can be obtained without sacrificing the high thermal conductivity of the thermally conductive filler.

The polysiloxane resin can be classified into an addition-reaction curing type polysiloxane, a condensation-reaction curing type polysiloxane and others according to the curing reaction mechanism. With respect to the polysiloxane classified according to the reaction mechanism, from the viewpoint of the productivity and working properties, an addition-reaction curing type polysiloxane is preferably used. With respect to the addition-reaction curing type polysiloxane, there has been known one which comprises (a) an unsaturated group-containing polyorganosiloxane which is a base polymer, (b) a hydrogen group-containing polyorganosiloxane which is a crosslinking agent, and (c) a platinum compound which is a curing catalyst.

With respect to the unsaturated group-containing polyorganosiloxane as component (a), in the organic group bonded to a silicon atom per molecule, at least 0.5 or more unsaturated groups on average are preferably contained. When the number of unsaturated groups per molecule is less than 0.5, the component which does not take part in crosslinking is increased, so that a satisfactory cured product cannot be obtained. When the number of unsaturated groups per molecule is 0.5 or more, a cured product can be obtained basically, but, when the number of unsaturated groups per molecule is too large, the resultant cured product is poor in heat resistance, so that the intended object cannot be achieved. Therefore, the number of unsaturated groups per molecule is preferably in the range of from 0.5 to 2.0. The unsaturated group is preferably a vinyl group from the viewpoint of facilitating preparation of a polyorganosiloxane. The unsaturated group may be bonded to any position of an end of the molecular chain and a side end of the molecular chain, but, from the viewpoint of increasing the curing rate and achieving high heat resistance of the cured product, the unsaturated group is preferably bonded to an end of the molecular chain.

As examples of other functional groups in the unsaturated group-containing polyorganosiloxane, there can be mentioned substituted or unsubstituted monovalent hydrocarbon groups, and examples of such groups include alkyl groups, such as methyl, ethyl, propyl, butyl, hexyl, and dodecyl; aryl groups, such as phenyl; aralkyl groups, such as 2-phenylethyl and 2-phenylpropyl; and substituted hydrocarbon groups, such as chloromethyl and 3,3,3-trifluoropropyl. A methyl group or a phenyl group is preferred in view of easy synthesis of the compound.

The structure of the unsaturated group-containing polyorganosiloxane may be either linear or branched. With respect to the viscosity of the unsaturated group-containing polyorganosiloxane, there is no particular limitation, but the polyorganosiloxane preferably has a viscosity at 23° C. of 0.01 to 50 Pa·s.

Generally, an unsaturated group-containing polyorganosiloxane is obtained by subjecting a cyclic siloxane, such as hexamethylcyclotrisiloxane, octamethylcyclotetrasiloxane, or tetravinyltetramethylcyclotetrasiloxane, and an organosiloxane having $R_3SiO_{0.5}$ (wherein R is a monovalent hydrocarbon group) units to equilibrated polymerization in the presence of an appropriate catalyst, such as an alkali or an acid, and then subjecting the resultant product to neutralization step and removing the excess low molecular-weight siloxane component.

The hydrogen group-containing polyorganosiloxane as component (b) is a siloxane compound having a Si—H bond, which is a component that serves as a crosslinking agent. The amount of the incorporated component (b) is an amount such that the number of hydrogen atoms directly bonded to a silicon atom becomes 0.2 to 5.0, relative to one unsaturated group of component (a). When the number of the hydrogen atoms is less than 0.2, curing does not satisfactorily proceed, and, when the number of the hydrogen atoms is more than 5.0, the resultant cured product becomes too hard, and further the physical properties of the composition after cured are likely to be adversely affected. It is necessary that the number of hydrogen groups bonded to a silicon atom contained per molecule be at least 2 or more, but, with respect to the other conditions, organic groups other than a hydrogen group, bonding position, polymerization degree, structure and others, there is no particular limitation, and two types or more of hydrogen group-containing polyorganosiloxanes may be used.

The hydrogen group-containing polyorganosiloxane representatively has in the molecule thereof two or more units represented by the following general formula (4):

$$(R^b)_x(R^c)_ySiO_{(4-x-y)2} \qquad (4)$$

wherein:
$R^b$ is a hydrogen atom;
$R^c$ is a $C_{1-6}$ alkyl group (for example, methyl, ethyl, propyl, butyl, pentyl, or hexyl, preferably methyl) or a phenyl group;
x is 1 or 2; and
y is an integer of 0 to 2, with the proviso that x+y is 1 to 3.

Examples of siloxane skeletons in the hydrogen group-containing polyorganosiloxane include those which are cyclic, branched, or linear, and preferred is a cyclic or branched skeleton.

The platinum compound as component (c) is a curing catalyst used for reacting an unsaturated group of component (a) with a hydrogen group of component (b) to obtain a cured product. Examples of the platinum compounds include chloroplatinic acid, a platinum-olefin complex, a platinum-vinylsiloxane complex, a platinum-phosphorus complex, a platinum-alcohol complex, and platinum black. The amount of the platinum compound incorporated is 0.1 to 1,000 ppm, in terms of a platinum element, based on the unsaturated group-containing polyorganosiloxane as component (a). When the amount of the platinum compound is less than 0.1 ppm, curing does not satisfactorily proceed, and, even when the amount of the platinum compound is more than 1,000 ppm, an improvement of the curing rate cannot particularly be expected. For obtaining a longer pot life, the activity of the catalyst can be suppressed by adding a reaction inhibitor. Examples of known reaction inhibitors for metals of the platinum group include acetylenic alcohols, such as 2-methyl-3-butyn-2-ol and 1-ethynyl-2-cyclohexanol, and diallyl maleate.

As a method for preparing the composition having incorporated thereinto the thermally conductive filler, the composition may be prepared by mixing together the siloxane compound, the polysiloxane resin, and the thermally conductive filler using a kneading apparatus, or by first mixing the siloxane compound and the filler to subject the filler to surface treatment, and then dispersing the resultant filler in the polysiloxane resin. Further, if necessary, the composition may be subjected to treatment by heating, under a reduced pressure, or by another known method. Further, when the composition contains the above-mentioned addition-reaction curing type polyorganosiloxane, a procedure can be performed in which a resin composition having incorporated the above-mentioned component (a) is previously prepared and, immediately before being cured, a mixture of component (b) and component (c) is added to the resin composition.

The amount of the siloxane compound represented by the general formula (1) incorporated into the thermally conductive composition is in the range of from 0.01 to 20 parts by mass, relative to 100 parts by mass of the thermally conductive filler. When the amount of the siloxane compound is in this range, the thermal conductivity can be increased while increasing the filling property of the thermally conductive filler. The amount of the siloxane compound incorporated is more preferably in the range of from 0.1 to 15 parts by mass. Further, 1 part by mass or more of the siloxane compound is preferably used, relative to 100 parts by mass of the polysiloxane resin which is a base polymer. When the amount of the siloxane compound relative to the polysiloxane resin is less than 1 part by mass, the surface treatment effect for the thermally conductive filler is reduced, making high incorporation difficult. When the amount of the siloxane compound is too large, the mechanical physical properties and heat resistance of the composition after cured are adversely affected, and therefore the amount of the siloxane compound is more preferably in the range of from 0.1 to 500 parts by mass.

In the thermally conductive polysiloxane composition in the present invention, if necessary, a pigment, a flame retardant, a tackifier, a heat resistance imparting agent, a diluent, or an organic solvent and others, which have been known to those skilled in the art, can be appropriately incorporated in such an amount that the effects of the present invention are not sacrificed.

When the polysiloxane resin in the thermally conductive polysiloxane composition in the present invention has a curable functional group, a silicone rubber can be obtained by curing the polysiloxane composition. A curing reaction of the polysiloxane composition can be conducted by a method appropriately selected according to the type of the curable functional group of the polysiloxane resin.

When using a polyorganosiloxane having, as a curable functional group, a functional group which causes a curing reaction due to heat, such as an epoxy group, the thermally conductive polysiloxane composition can be cured by applying heat to the composition. The conditions for heat curing are known to those skilled in the art, and, as examples of apparatuses which can be used in a curing reaction caused due to heat, there can be mentioned apparatuses known to those skilled in the art, such as a constant temperature bath. The heating conditions can be appropriately selected according to the heat resistance temperature of a member to which the composition is applied, and the curing time can be determined. For example, heat at 40 to 100° C. can be applied to the composition for a period of time in the range of from 1 minute to 5 hours. The heating temperature is preferably 50 to 90° C. from the viewpoint of the operating properties, more preferably 60 to 80° C. The heating time is preferably 5 minutes to 3 hours from the viewpoint of facilitating the curing step, more preferably 10 minutes to 2 hours.

A silicone rubber obtained by curing the thermally conductive polysiloxane composition in the present invention can be used as a radiator member for electronic devices and electronic parts, such as an integrated circuit element.

EXAMPLES

Hereinbelow, the present invention will be described with reference to the following Examples, which should not be construed as limiting the scope of the present invention. In the following Examples and Comparative Examples, the "part(s)" indicates part(s) by mass.

Synthesis of Materials

Example 1

Cyclic Siloxane Compound Having a Polysiloxane Chain Having a Polymerization Degree of 20

[Chemical formula 8]

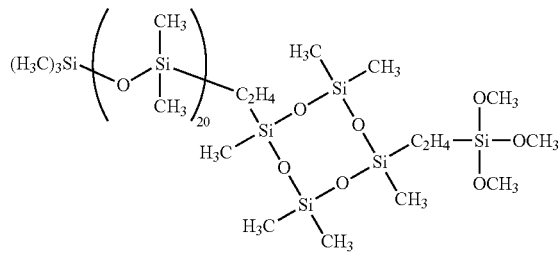

In a 5,000 mL flask, 1,100 g of vinyltrimethoxysilane was added to a solution of 440 g of toluene and 1,992 g of a cyclic siloxane having two Si—H bonds in the presence of a platinum catalyst. The resultant mixture was subjected to reaction at 120° C. for 3 hours. The solvent was removed from the resultant reaction mixture, followed by distillation, to obtain a colorless liquid.

300 g of a linear vinylpolysiloxane (polysiloxane represented by $MD_{20}M^{Vi}$; manufactured by Momentive Performance Materials Inc.) was added to 75 g of the above-obtained liquid. A platinum catalyst was further added and the resultant mixture was subjected to reaction at 120° C. for 5 hours, obtaining an intended siloxane in the form of an oily material.

In the FT IR measurement, an absorption peak appearing around 2,850 cm$^{-1}$ ascribed to a methoxy group was confirmed. In the $^1$H NMR measurement (at 500 MHz, in CDCl$_3$), a signal appearing at 3.55 ppm ascribed to a methoxy group was observed. The area ratio of the signal ascribed to a methoxy group and the signal appearing around 0.01 ppm ascribed to a methyl group adjacent to silicon has confirmed that one linear polysiloxane structure in which the number of D units is about 20 is introduced per molecule. From the results of the GPC measurement, a monomodal peak (degree of dispersion: 1.13) was confirmed, and the measured average molecular weight was consistent with the structural formula.

Example 2

Cyclic Siloxane Compound Having a Polysiloxane Chain Having a Polymerization Degree of 30

[Chemical formula 9]

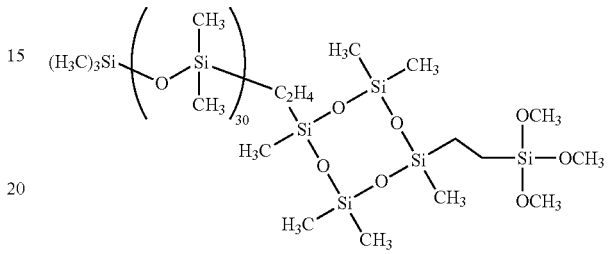

450 g of a linear vinylpolysiloxane (polysiloxane represented by $MD_{30}M^{Vi}$; manufactured by Momentive Performance Materials Inc.) was added to 77 g of the liquid obtained in Example 1, which is a reaction product of a cyclic siloxane and vinyltrimethoxysilane. A platinum catalyst was further added and the resultant mixture was subjected to reaction at 120° C. for 5 hours, obtaining an intended siloxane in the form of an oily material.

In the FT IR measurement, an absorption peak appearing around 2,850 cm$^{-1}$ ascribed to a methoxy group was confirmed. In the $^1$H NMR measurement (at 500 MHz, in CDCl$_3$), a signal appearing at 3.56 ppm ascribed to a methoxy group was observed. The area ratio of the signal ascribed to a methoxy group and the signal appearing around 0.04 ppm ascribed to a methyl group adjacent to silicon has confirmed that one linear polysiloxane structure in which the number of D units is about 30 is introduced per molecule. From the results of the GPC measurement, a monomodal peak (degree of dispersion: 1.15) was confirmed, and the measured average molecular weight was consistent with the structural formula.

Example 3

Cyclic Siloxane Compound Having a Polysiloxane Chain Having a Polymerization Degree of 40

[Chemical formula 10]

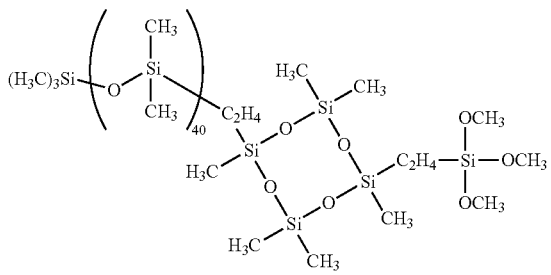

An intended siloxane in the form of an oily material was obtained in substantially the same manner as in Example 2 except that, instead of the polysiloxane represented by $MD_{30}M^{Vi}$ as a linear vinylpolysiloxane, a polysiloxane represented by $MD_{40}M^{Vi}$ was used. After completion of the reaction, the $^1$H NMR, FT IR, and GPC measurement confirmed that the intended siloxane was obtained.

Example 4

Cyclic Siloxane Compound (2) Having a Polysiloxane Chain Having a Polymerization Degree of 30

[Chemical formula 11]

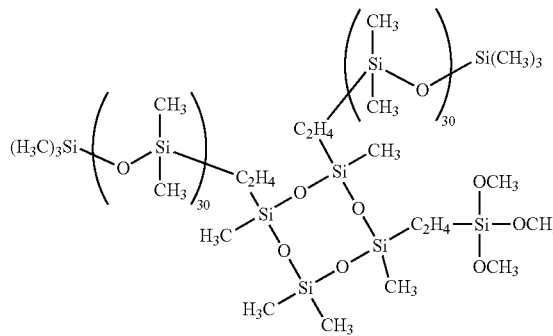

An intended siloxane in the form of an oily material was obtained in substantially the same manner as in Example 1 except that the cyclic siloxane was changed to one having three Si—H bonds, and that a polysiloxane represented by $MD_{30}M^{Vi}$ as a linear vinylpolysiloxane was used in a two-fold amount. After completion of the reaction, the $^1$H NMR, FT IR, and GPC measurement confirmed that the intended siloxane was obtained.

Comparative Example 1

Cyclic Siloxane Compound Having a Polysiloxane Chain Having a Polymerization Degree of 70

[Chemical formula 12]

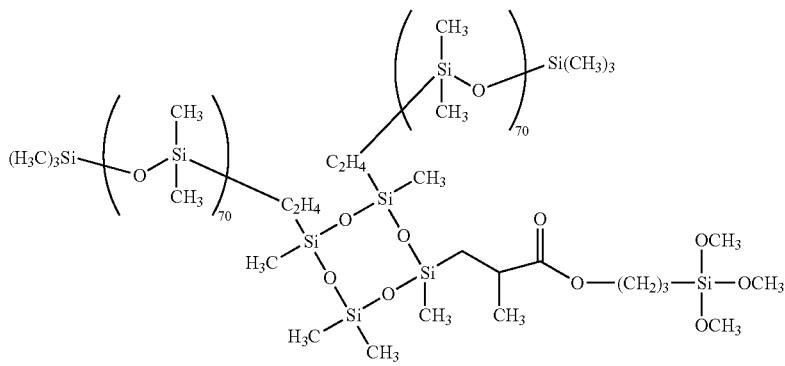

An intended siloxane in the form of an oily material was obtained in substantially the same manner as in Examples 4 except that, instead of the vinyltrimethoxysilane, 3-(methacryloyloxy)propyltrimethoxysilane was used, and that, instead of the polysiloxane represented by $MD_{30}M^{Vi}$ as a linear vinylpolysiloxane, a polysiloxane represented by $MD_{70}M^{Vi}$ was used. After completion of the reaction, the $^1$H NMR, FT IR, and GPC measurement confirmed that the intended siloxane was obtained.

Comparative Example 2

Cyclic Siloxane Compound Having a Polysiloxane Chain Having a Polymerization Degree of 200

[Chemical formula 13]

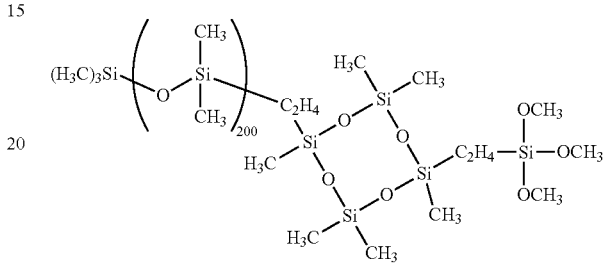

An intended siloxane in the form of an oily material was obtained in substantially the same manner as in Examples 1 except that, instead of the polysiloxane represented by $MD_{30}M^{Vi}$ as a linear vinylpolysiloxane, a polysiloxane represented by $MD_{200}M^{Vi}$ was used. After completion of the reaction, the $^1$H NMR, FT IR, and GPC measurement confirmed that the intended siloxane was obtained.

The materials used in the following Formulation Examples and Comparative Formulation Examples are as shown below.

<Thermally Conductive Filler>

Alumina having a rounded shape and having an average particle diameter of 0.4 μm (Sumicorundum AA-04, manufactured by Sumitomo Chemical Co., Ltd.)

<Polyorganosiloxane Resin>

α,ω-Divinylpolydimethylsiloxane; viscosity: 0.35 Pa·s

<Surface Treatment Agent: Siloxane Compound Represented by the General Formula (1)>

The siloxanes obtained in Examples 1 to 4 and Comparative Examples 1 and 2 were respectively used in Formulation Examples 1 to 4 and Comparative Formulation Examples 1 and 2. The combinations of the Examples and Comparative Examples and the Formulation Examples and Comparative Formulation Examples are shown in Table 1. In the following description, the term "polymerization number" means a total number of —Si(CH$_3$)$_2$O$_{2/2}$— units (D units) contained in the siloxane compound.

<<Curing Composition>>
<Unsaturated Group-Containing Polyorganosiloxane>
  α,ω-Divinylpolydimethylsiloxane; viscosity: 0.35 Pa·s
  α-Vinylpolydimethylsiloxane; viscosity: 0.35 Pa·s
<Hydrogen Group-Containing Polyorganosiloxane>
  Organohydrogenpolysiloxane represented by MD$^H{}_{20}$D$_{20}$M; viscosity: 0.03 Pa·s
  Organohydrogenpolysiloxane represented by M$^H$D$_{20}$M$^H$; viscosity: 0.02 Pa·s
<Platinum Catalyst>
  Pt-M$^{Vi}$M$^{Vi}$ complex (1,2-divinyltetramethyldisiloxane complex of platinum)
<Reaction Inhibitor>
  Diallyl maleate (manufactured by Tokyo Chemical Industry Co., Ltd.)
[Surface Treatment of Alumina with a Siloxane Compound]

Formulation Example A

1 Part by mass of each of the siloxane compounds corresponding to Formulation Examples 1 to 4 and Comparative Formulation Examples 1 and 2 as the siloxane compound represented by the general formula (1), a predetermined amount of α,ω-divinylpolydimethylsiloxane (viscosity: 0.35 Pa·s) or α-vinylpolydimethylsiloxane (viscosity: 0.35 Pa·s) as the polyorganosiloxane resin, and 100 parts by mass of Sumicorundum AA-04 as alumina were kneaded by a predetermined method using a planetary mixer to obtain thermally conductive polysiloxane composition A having surface-treated alumina. With respect to the obtained composition A, a viscosity at 23° C. was measured at 10 rpm for one minute in accordance with JIS K6249 using a rotational viscometer (Vismetron VDH) (manufactured by Shibaura System Co., Ltd.) and using a No. 7 rotor. The results are shown in Table 1.

Formulation Example B

To 66.65 parts by weight of thermally conductive polysiloxane composition A prepared in Formulation Example A were added 4.5 parts by mass of α,ω-divinylpolydimethylsiloxane (viscosity: 0.35 Pa·s) as the unsaturated group-containing polyorganosiloxane and the above-mentioned platinum-vinylsiloxane complex in such an amount that the catalyst concentration became 2 ppm in terms of a platinum atom. Separately, to 66.65 parts by weight of the remaining thermally conductive polysiloxane composition A were added 0.7 part by mass of MD$^H{}_{20}$D$_{20}$M and 1.06 parts by mass of M$^H$D$_{20}$M$^H$ as the hydrogen group-containing polyorganosiloxane and 0.002 part by mass of diallyl maleate as a reaction inhibitor. The resultant mixtures were individually kneaded by a predetermined method using a planetary mixer to obtain thermally conductive polysiloxane compositions B-1 and B-2. The obtained compositions B-1 and B-2 were mixed in a predetermined ratio, and the resultant mixture was uniformly stirred and then poured into a mold being made of aluminum coated with Teflon (registered trademark) and having an internal dimension of 6 mm (depth)× 60 mm (length)×30 mm (width) and cured using a hot-air circulating dryer at 70° C. for 30 minutes. The cured product was cooled to 23° C., and then a Type E hardness was measured in accordance with JIS K6249. Further, a thermal conductivity of the cured product was measured using TPS1500 (manufactured by Kyoto Electronics Manufacturing Co., Ltd.). Separately, polysiloxane compositions B-1 and B-2 were placed in an environment at 70° C. for 3 days, and cooled to 23° C., and then the polysiloxane compositions B-1 and B-2 were mixed in a predetermined ratio, and the resultant mixture was uniformly stirred and then poured into a mold being made of aluminum coated with Teflon (registered trademark) and having an internal dimension of 6 mm (depth)×60 mm (length)×30 mm (width) and cured using a hot-air circulating dryer at 70° C. for 30 minutes. The cured product was cooled to 23° C., and then a Type E hardness was measured in accordance with JIS K6249. The results are shown in Table 1 below.

[Table 1]

TABLE 1

|  |  |  |  |  | Formulation Example |  |  |  |  |  | Comparative Formulation Example |  |
|---|---|---|---|---|---|---|---|---|---|---|---|---|
|  |  |  |  | 1-1 | 1-2 | 1-3 | 1-4 | 2 | 3 | 4 | 1 | 2 |
| Thermally conductive filler | SumicorundumAA-04 |  |  | 100 | 100 | 100 | 100 | 100 | 100 | 100 | 100 | 100 |
| Polyorgansiloxane resin | Viscosity 0.35Pas M$^H$D$_n$M$^H$ |  |  | 33.3 | 20.90 | 14.62 | 8.30 | 33.3 | 33.3 | 33.3 | 33.3 | 33.3 |
|  | Viscosity 0.35Pas MD$_n$M$^H$ |  |  |  | 12.70 | 19.13 | 25.60 |  |  |  |  |  |
| Surface treatment agnet |  | Polymerization | Viscosity |  |  |  |  |  |  |  |  |  |
|  | d | number | (cP) |  |  |  |  |  |  |  |  |  |
|  | Example 1     20 | 20 | 38 | 1 | 1 | 1 | 1 |  |  |  |  |  |
|  | Example 2     30 | 30 | 40 |  |  |  |  | 1 |  |  |  |  |
|  | Example 3     40 | 40 | 64 |  |  |  |  |  | 1 |  |  |  |
|  | Example 4     30 | 60 | 80 |  |  |  |  |  |  | 1 |  |  |
|  | Comparative  70 Example 1 | 140 | 190 |  |  |  |  |  |  |  | 1 |  |
|  | Comparative  200 Example 2 | 200 | 380 |  |  |  |  |  |  |  |  | 1 |
| Viscosity before cured | Viscosity No. 7 × 10 rpm |  |  | 55 | 58 | 60 | 64 | 75 | 80 | 68 | 104 | 185 |
| Polyorganosiloxane resin | Viscosity 0.35 Pas M$^H$D$_n$M$^H$ |  |  | 4.5 | 4.50 | 4.50 | 4.50 | 4.5 | 4.5 | 4.5 | 4.5 | 4.5 |
| Platinum catalyst | Pt-M$^{Vi}$M$^{Vi}$ |  |  |  |  |  |  |  |  |  |  |  |
| Organohydrogen | MD$^H{}_{20}$D$_{20}$M |  |  | 0.7 | 0.57 | 0.52 | 0.47 | 0.7 | 0.7 | 0.7 |  |  |

TABLE 1-continued

|  |  | Formulation Example ||||||| Comparative Formulation Example ||
| --- | --- | --- | --- | --- | --- | --- | --- | --- | --- | --- |
|  |  | 1-1 | 1-2 | 1-3 | 1-4 | 2 | 3 | 4 | 1 | 2 |
| polysiloxane | $M^HD_{20}M^H$ | 1.06 | 0.90 | 0.80 | 0.70 | 1.06 | 1.06 | 1.06 |  |  |
| Reaction inhibitor | Diallyl maleate | 0.00 | 20.00 | 0.00 | 0.00 | 0.00 | 2 0. | 002 | 0.002 |  |
| Hardness (Type E) | Initial | 51 | 52 | 52 | 54 | 49 | 50 | 50 | 41 | 39 |
| 100° C., 30 min. | After accelerated test at 70° C. for 3 days | 51 | 54 | 51 | 55 | 51 | 55 | 54 | 30 | 24 |
|  | Change of hardness | 0 | 2 | 1 | 1 | 2 | 5 | 4 | 11 | 15 |
| Thermal conductivity (W/mK) |  | 0.99 | 1.00 | 1.01 | 0.99 |  | 0.98 | 0.99 | 0.95 |  |

As apparent from Table 1, by using as a surface treatment agent the siloxane compound which is represented by the general formula (1), and which has a siloxane chain structure having a polymerization number in the predetermined range so as to have an appropriate length, there can be obtained a composition which is advantageous not only in that the composition has such a viscosity that it can be handled, but also in that the composition has such excellent stability that it suffers almost no change in the hardness in an accelerated test. In contrast, when the siloxane compound represented by the general formula (1) is not used, the composition is lowered in the hardness with the passage of time, causing a problem about the stability. Lowered hardness is connoted with a dark, filled-in triangle which symbolizes that the numeral that follows is negative.

INDUSTRIAL APPLICABILITY

The siloxane compound of the present invention is advantageous in that a thermally conductive polysiloxane composition having excellent fluidity and excellent stability can be obtained from the siloxane compound. Therefore, the siloxane compound can be effectively widely used as a material for a radiator member for various electronic devices and electronic parts, such as an integrated circuit element.

The invention claimed is:

1. A siloxane compound represented by the following general formula (1):

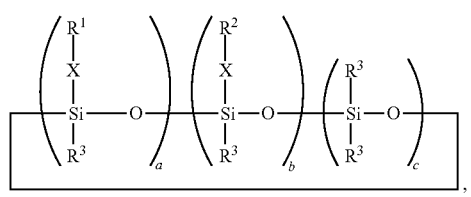

(1)

wherein:
R$^1$ is a group having an alkoxysilyl group having 1 to 4 carbon atoms;
R$^2$ is a linear organosiloxy group represented by the following general formula (2):

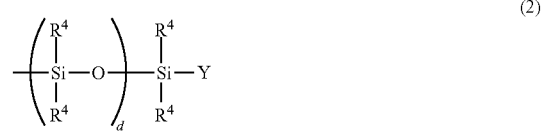

(2)

wherein each R$^4$ is independently a monovalent hydrocarbon group
having 1 to 12 carbon atoms, Y is a monovalent hydrocarbon group
having 1 to 6 carbon atoms, and d is an integer of 10 to 50;
each X is independently a divalent hydrocarbon group having 2 to 10 carbon atoms;
a is 1;
b is an integer of 1 or more;
c is an integer of 0 or more;
a+b+c is 4; and
each R$^3$ is independently a monovalent hydrocarbon group having 1 to 6 carbon atoms.

2. The siloxane compound according to claim 1, wherein, in the general formula (1), b is 2, and d is 10 to 40.

3. The siloxane compound according to claim 1, wherein, in the general formula (1), b is 1.

4. A surface treatment agent for a thermally conductive filler, comprising the siloxane compound according to claim 1.

* * * * *